United States Patent Office 2,927,127
Patented Mar. 1, 1960

2,927,127

PROCESS FOR PRODUCING PARA TERTIARY BUTYL CYCLOHEXANYL ESTERS AND THE INTERMEDIATE ALCOHOL THEREFOR

Willard T. Somerville, Fair Haven, and Ernst T. Theimer, Rumson, N.J., assignors to Van Ameringen-Haebler, Inc., New York, N.Y., a corporation of New York No Drawing. Application April 8, 1958
Serial No. 727,025

10 Claims. (Cl. 260—488)

This invention relates to processes for producing para tertiary butyl cyclohexanyl esters, particularly the lower aliphatic esters thereof, and to the production of the corresponding alcohol.

The principal object of the invention is to provide simple efficient processes for the production of such compounds.

Para tertiary butyl cyclohexanol can be made by the hydrogenation of para tertiary butyl phenol with nickel catalyst. The product para tertiary butyl cyclohexanol when acetylized is a perfume material. Para tertiary butyl cyclohexanol is made up of two isomers, namely, a cis and trans isomer. These isomers at equilibrium are present in proportions of approximately 30% cis isomer and 70% trans isomer. These proportions are not materially altered by acetylation. We have found in accordance with our invention that although the trans isomer of the acetate which is present in the much larger amount has some odor, the cis isomer present in the lesser amount has an odor several times the strength of the trans isomer. The problem to be solved accordingly was how to obtain the cis isomer in an increased amount over that obtained by the direct acetylation of the equilibrium mixture and to end up with a product in which the cis isomer was in major or predominating proportions.

The reaction involved is as follows:

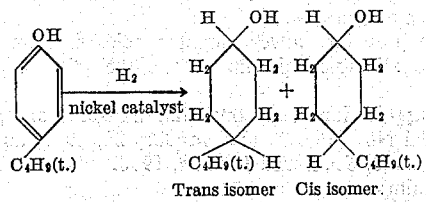

This compound may be acetylized to give:

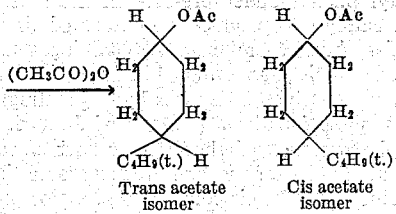

From the mixture of cis and trans acetates formed above we have prepared the two isomers in pure form by careful fractionation. The odor strength of the separate isomers was then established upon evaluation by a skilled perfumer. The cis isomer was found to be approximately three times as strong as the trans isomer and accordingly would be greately preferred not only because of its difference in odor strength but also because of its finer and less fatty odor.

We have also found in accordance with our invention that we can produce such predominating proportions of the cis isomer of para tertiary butyl cyclohexanol by carrying out the hydrogenation of the para tertiary butyl phenol using rhodium as a hydrogenation catalyst.

We have also found in accordance with our invention that we can produce such predominating proportion of the cis isomer by hydrogenating para tertiary butyl phenol using palladium as the hydrogenation catalyst.

In each of the processes mentioned the resulting cis-trans mixture of para tertiary butyl cyclohexanol may contain more than 50% of the cis isomer. When this mixture was then converted into the acetate, as, for example, by means of acetic anhydride, the resulting perfume material was more than twice as strong as was that obtained from the equilibrium mixture.

We have also found in accordance with our invention that we may prepare para tertiary butyl cyclohexanyl esters, for example the acetate, by the direct hydrogenation of para tertiary butyl phenyl acetate with the use of rhodium or ruthenium as a catalyst.

In addition to the acetate, other lower aliphatic acid esters, namely, the propionate, butyrate and isobutyrate have been prepared, each of them being a valuable perfume material. In every case, the cis isomer ester was two to five times as strong as the corresponding trans isomer.

The following are examples of the manner in which we propose to carry out our invention. It should be understood that these examples are illustrative and that the invention is not to be considered as restricted thereto except as indicated in the appended claims.

*Example 1.*—300 grams of para tertiary butyl phenol are dissolved in 300 ml. of specially denatured ethyl alcohol No. 1, the mixture placed in a stirring autoclave, and 15 grams of 5% rhodium on carbon are added. The mixture is gently warmed to 90 to 100° F. (37–38° C.). The autoclave is pressured to 1,000 pounds with hydrogen and stirring is started. The hydrogenation proceeds very rapidly and the absorption of hydrogen is essentially quantitative. The yield of hydrogenated material is approximately 95%.

The para tertiary butyl cyclohexanol formed when analyzed by vapor chromatography was found to contain 87.5% of the cis isomer.

For the preparation of the acetate, 196 grams of the cis para tertiary butyl cyclohexanol as obtained above is refluxed for five hours with an equal weight of acetic anhydride. After cooling, the mixture is decomposed by adding warm water and then the oily layer is washed neutral with water. The oil is separated and vacuum distilled. In this way 196 parts of para tertiary butyl cyclohexanyl acetate are obtained, analyzing by gas chromatography 83% of the cis isomer. The constants of the acetate were:

$$D_{20}\text{—}0.9350$$
$$nD_{20}\text{—}1.4507$$

*Example 2.*—800 grams of para tertiary butyl phenol are placed in a stirring autoclave and 2% by weight or 16 grams of palladium metal (based on the weight of said phenol) are added. The palladium is supported on barium carbonate in the proportion of 5% palladium to 95% barium carbonate. The mixture is heated to 350–400° F. The autoclave is pressured to 1,500 to 1,800 p.s.i. with hydrogen, and maintained at that pressure and temperature. The hydrogenation proceeds very rapidly, and the yield of hydrogenated material is practically quantitative, the product being substantially completely para tertiary butyl cyclohexanol.

The para tertiary butyl cyclohexanol formed, when analyzed by vapor chromatography is found to contain 56% of the cis isomer.

The acetate was prepared from the product in a manner similar to that stated in Example 1 above.

We have found in accordance with our invention that it is possible to hydrogenate a phenylic ester to yield a cyclohexanyl ester using a noble metal hydrogenation catalyst such as rhodium or ruthenium.

Example 3.—768 grams of para tertiary butyl phenyl acetate is mixed in a stirring autoclave with 2% by weight of 5% rhodium metal on carbon catalyst. Said acetate is hydrogenated with hydrogen in the autoclave under a pressure of 1,500 to 2,000 p.s.i. with a temperature during the reaction for the most part at about 140–200° F.

On distillation of the hydrogenation product 374 grams of para tertiary butyl cyclohexanyl acetate is obtained testing 56.3% of known cis isomer, the balance being the corresponding trans isomer, as determined by gas chromatography.

Example 4.—768 grams of para tertiary butyl phenol acetate and 2% by weight of 5% ruthenium metal on carbon are reacted in a stirring autoclave at a temperature between 165 and 200° F. The pressure of hydrogen during hydrogenation is between 1,000 and 1,700 p.s.i.

After the reaction is over the product is distilled to yield 160 grams of para tertiary butyl cyclohexanyl acetate testing 66% of known cis isomer, the balance being the corresponding trans isomer, as determined by gas chromatography.

The physical properties of cis and trans para tertiary butyl cyclohexanyl acetates are so close to each other that they cannot be used for identification or analysis. In order to distinguish between the two isomers it is necessary to use either infrared techniques or vapor chromatography.

In the following examples the formation of the propionate, butyrate and iso-butyrate ester compounds is given. In each of these examples the esters were formed from substantially pure cis para tertiary butyl cyclohexanol obtained by careful fractionation of the equilibrium mixture of cis and trans isomers thereof.

Example 5.—Preparation of cis-para tertiary butyl cyclohexanyl propionate: 150 parts of cis-para tertiary butyl cyclohexanol are heated to 90° C., and 183 parts of propionic anhydride are gradually added. The mixture is then allowed to reflux for four hours. After cooling, it is decomposed with warm water, washed neutral in warm water and sodium carbonate solution, dried, and finally vacuum distilled. In this way the pure propionate, testing 99.64% ester is obtained. Its constants are $D_{20}$ of 0.9299 and $nD_{20}$ of 1.4513. The yield amounts to 175 parts of the ester. This propionate has a rich, fruity, woody odor and is approximately five times the strength of the trans isomer, which was separately prepared by an analogous procedure. The physical constants of the trans propionate are:

Ester content was 99.64%
Specific gravity at 20° C.—0.9291
Index of refraction—1.4531

Example 6.—Preparation of cis-para tertiary butyl cyclohexanyl butyrate: 150 parts of cis-para tertiary butyl cyclohexanol were heated at 80° C. for 4 hours with 316 parts of butyric anhydride and 1 part of 85% phosphoric acid. It was then cooled and decomposed with water. The oil was repeatedly washed with warm sodium bicarbonate solution to remove unreacted butyric anhydride. After drying the ester was then vacuum distilled. It boils at 85 to 86° C. at 2 to 3 mm. of mercury, and has a refractive index of 1.4511 at 20° C., and a density of 0.9229 at 20° C. The yield was approximately 165 parts. The transisomer was separately prepared by an analogous procedure. Its physical constants are:

Ester content was 100.8%
Refraction index at 20° C.—1.4526
Specific gravity at 20° C.—0.9209.

This cis isomer has an odor which is twice the strength of the trans isomer.

Example 7.—Preparation of cis-para tertiary butyl cyclohexanyl isobutyrate: This was made by refluxing a mixture of 150 parts of cis-para tertiary butyl cyclohexanol with 316 parts of isobutyric anhydride for 5 hours. It was cooled, washed with warm water, and then with hot sodium carbonate solution until neutralized. After drying it was vacuum distilled. The boiling point is 85° C. at 2 to 3 mm. The index of refraction at 20° C. is 1.4485. The specific gravity at 20° C. is 0.9162. This ester tests 97.18% by saponification. The yield is 160 parts of ester. The odor strength of the cis isomer was judged to be twice that of the trans isomer. The trans isomer was separately prepared by an analogous procedure. Its physical constants are:

Ester content was 98.5%
Specific gravity at 20° C.—0.9141
Index of refraction at 20° C.—1.4485

The cis and trans formate were made from the corresponding pure cyclohexanols employing formic acid.

In the case of the propionate, butyrate and isobutyrate esters, instead of preparing the propionate, butyrate and isobutyrate esters as set forth in Examples 5 to 7 respectively, we may prepare a mixture of the cis and trans propionates containing a predominant amount of the cis isomer ester by the esterification of the para tertiary butyl cyclohexanol prepared in accordance with Examples 1 or 2. This para tertiary butyl cyclohexanol is a mixture of the cis and trans isomers with a predominant proportion of the cis isomer. Accordingly, when esterified to produce the propionate following the procedure of Example 5, the mixture of cis and trans isomers with a predominant part of the cis isomer ester is obtained. Similarly, the formate and isobutyrate esters may be prepared from the cyclohexanol mixtures of Examples 1 or 2 to form a corresponding mixture of the cis and trans formates and isobutyrates respectively, with the cis ester predominant in each instance.

In general, in all the hydrogenations in which a high cis content is desired, the cis content is higher the lower the temperature of the hydrogenation. This is due to the fact that many of these catalysts also act as isomerizing agents at higher temperatures, thus producing lower cis contents, so that maintaining the lowest practical temperature will yield the best results in terms of the cis content of the product.

The expression "lower alkanoic acid" is intended to designate alkanoic acid up to and including 4 carbon atoms.

This application is a continuation-in-part of application Serial No. 636,692, filed January 28, 1957, now Patent No. 2,840,599, issued June 24, 1958.

We claim:
1. A process which comprises hydrogenating para tertiary butyl phenol under pressure in the presence of a rhodium catalyst to produce a mixture of cis and trans para tertiary butyl cyclohexanol containing a major proportion of said cis-para tertiary butyl cyclohexanol.

2. A process which comprises hydrogenating para tertiary butyl phenol under a pressure of the order of 1000 p.s.i. in the presence of rhodium on carbon catalyst to produce a mixture of cis and trans para tertiary butyl cyclohexanol with the cis compound in major proportion.

3. A process which comprises passing hydrogen into a mixture of para tertiary butyl phenol heated to about 37° C. under a hydrogen pressure of about 1,000 p.s.i. in the presence of a rhodium on carbon catalyst to produce a mixture of cis and trans para tertiary buty cyclohexanol containing about 87.5% of cis-para tertiary butyl cyclohexanol.

4. A process which comprises hydrogenating para tertiary buty phenol under pressure in the presence of a palladium catalyst to produce a mixture of cis and trans para tertiary butyl cyclohexanol containing a major proportion of said cis-para tertiary butyl cyclohexanol.

5. A process which comprises hydrogenating para tertiary butyl phenol under a pressure of the order of 1,000 p.s.i. in the presence of palladium on carbon catalyst to produce a mixture of cis and trans para tertiary butyl cyclohexanol with the cis compound in major proportion.

6. A process which comprises hydrogenating para tertiary butyl phenol under pressure in the presence of a rhodium catalyst to produce a mixture of cis and trans para tertiary butyl cyclohexanol containing a major proportion of said cis-para tertiary butyl cyclohexanol, and esterifying said mixture with a lower alkanoic acid to produce a mixture of cis and trans isomers of para tertiary butyl cyclohexanyl ester containing a major proportion of said cis isomer.

7. A process which comprises hydrogenating a lower alkanoic ester of para tertiary butyl phenol under pressure in the presence of a rhodium catalyst to produce a mixture of cis and trans para tertiary butyl cyclohexanyl lower alkanoic ester containing a major proportion of said cis ester.

8. A process which comprises hydrogenating para tertiary butyl phenyl acetate under pressure in the presence of a rhodium catalyst to produce a mixture of cis and trans para tertiary butyl cyclohexanyl acetate containing a major proportion of said cis-para tertiary butyl cyclohexanyl acetate.

9. A process which comprises hydrogenating a lower alkanoic ester of para tertiary butyl phenol under pressure in the presence of a palladium catalyst to produce a mixture of cis and trans para tertiary butyl cyclohexanyl lower alkanoic acid ester containing a major proportion of said cis ester.

10. A process which comprises hydrogenating para tertiary butyl phenyl acetate under pressure in the presence of a ruthenium catalyst to produce a mixture of cis and trans para tertiary butyl cyclohexanyl acetate containing a major proportion of said cis-para tertiary butyl cyclohexanyl acetate.

References Cited in the file of this patent

UNITED STATES PATENTS

| | | |
|---|---|---|
| 2,433,008 | Whitaker et al. | Dec. 23, 1947 |
| 2,478,261 | Frank | Aug. 9, 1949 |
| 2,582,743 | Bollmann et al. | Jan. 15, 1952 |
| 2,606,925 | Whitman | Aug. 12, 1952 |
| 2,606,926 | Kirby | Aug. 12, 1952 |
| 2,675,390 | Rosenblatt | Apr. 13, 1954 |
| 2,840,599 | Somerville et al. | June 24, 1958 |

OTHER REFERENCES

Komarewsky et al.: "Catalytic, Photochemical, and Electrolytic Reactions," "Technique of Organic Chemistry," vol. II, Second Edition, 1956, pp. 107–113.

Wheland: "Advanced Organic Chemistry," Second Edition, 1949, pp. 299–301.

Darzens et al.: Compt. rend. 152, 607–609 (1911).